Figure 1:
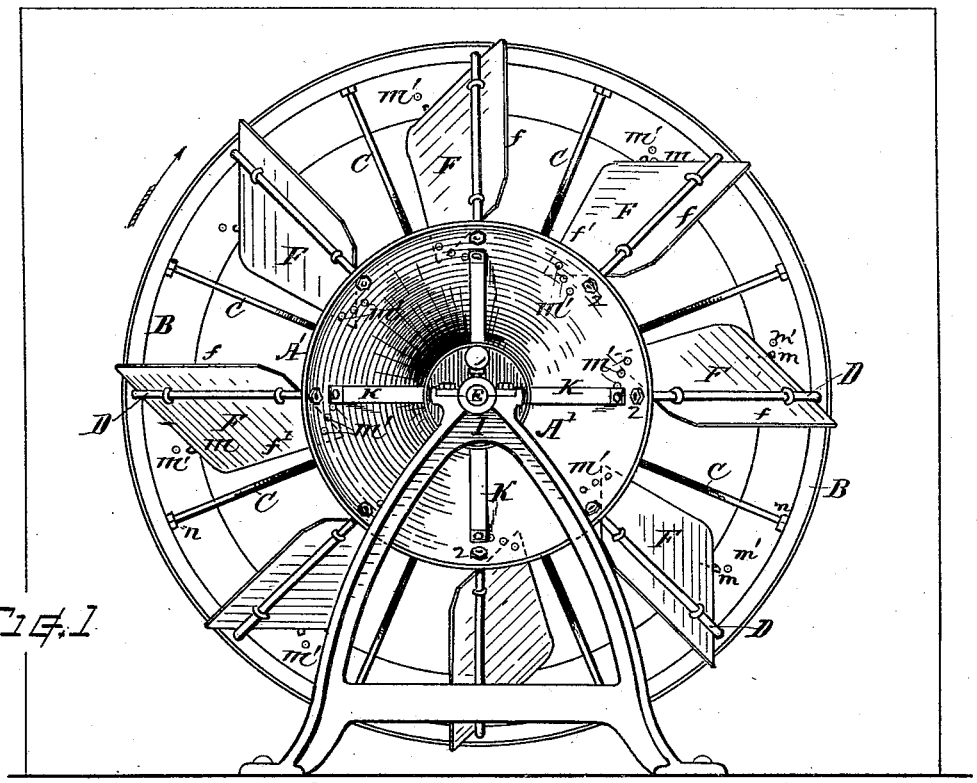

(No Model.) 3 Sheets—Sheet 1.

F. P. SMITH.
CONCENTRATING BLOWER.

No. 509,142. Patented Nov. 21, 1893.

Witnesses
Ella P. Blinn.
Simeon E. King

Inventor
Fred P. Smith
By Chas. H. Burleigh
Attorney.

(No Model.) 3 Sheets—Sheet 2.

F. P. SMITH.
CONCENTRATING BLOWER.

No. 509,142. Patented Nov. 21, 1893.

Witnesses.
Ella P. Blenus
Simon E. King

Inventor
Fred. P. Smith
By Chas. H. Burleigh
Attorney (No Model.)  3 Sheets—Sheet 3.

F. P. SMITH.
CONCENTRATING BLOWER.

No. 509,142.  Patented Nov. 21, 1893.

Witnesses.
Ella P. Blenus
Simon E. King

Inventor
Fred P. Smith
By Chas. H. Burleigh
Attorney

UNITED STATES PATENT OFFICE.

FRED P. SMITH, OF WORCESTER, ASSIGNOR TO THE SMITH HEATING AND VENTILATING COMPANY, OF BOSTON, MASSACHUSETTS.

CONCENTRATING-BLOWER.

SPECIFICATION forming part of Letters Patent No. 509,142, dated November 21, 1893.

Application filed December 27, 1892. Serial No. 456,351. (No model.)

*To all whom it may concern:*

Be it known that I, FRED P. SMITH, a citizen of the United States, residing at Worcester, in the county of Worcester and State of Massachusetts, have invented a new and useful Concentrating-Blower, of which the following, together with the accompanying drawings, is a specification sufficiently full, clear, and exact to enable persons skilled in the art to which this invention appertains to make and use the same.

One object of my present invention is to provide a desirable and efficient revoluble fan-wheel or blower of improved structure, adapted for use at a mouth or opening for inducing air currents in ventilating flues, and to render the construction in said blowers economical and convenient for manufacture in large as well as small sizes, while light and durable for service.

Another object is to provide a fan-wheel or blower having its blades or fans disposed in a manner to effect the elimination of centrifugal movement of the forced air, or in a manner to create a concentrated discharge of air instead of a diffused discharge as occurs in fan-wheels wherein the blades are disposed substantially radial, or with their longitudinal lines perpendicular to the axis of rotation.

Another object is to provide a fan-wheel or blower for the purpose named, having a series of transversely oblique fans or blades longitudinally disposed in angular positions at about forty-five degrees inclination relative to the axis of rotation; and combined with an axial-cone or body, a peripheral rim, and diagonally disposed supporting rods, to which said fans are secured in a manner to facilitate their oblique adjustment to meet the requirements of different situations and conditions of use. These objects I attain by the mechanism shown in the drawings, wherein—

Figure 2:
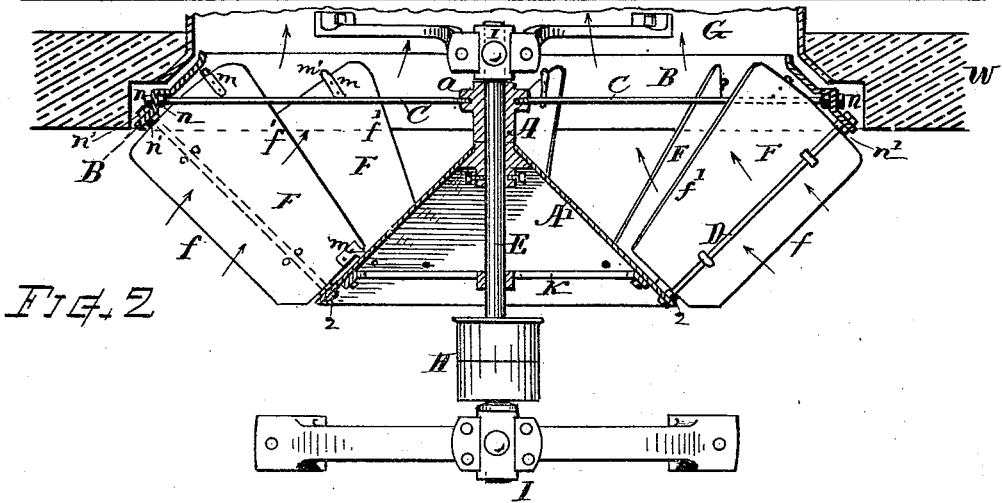
Figure 3:
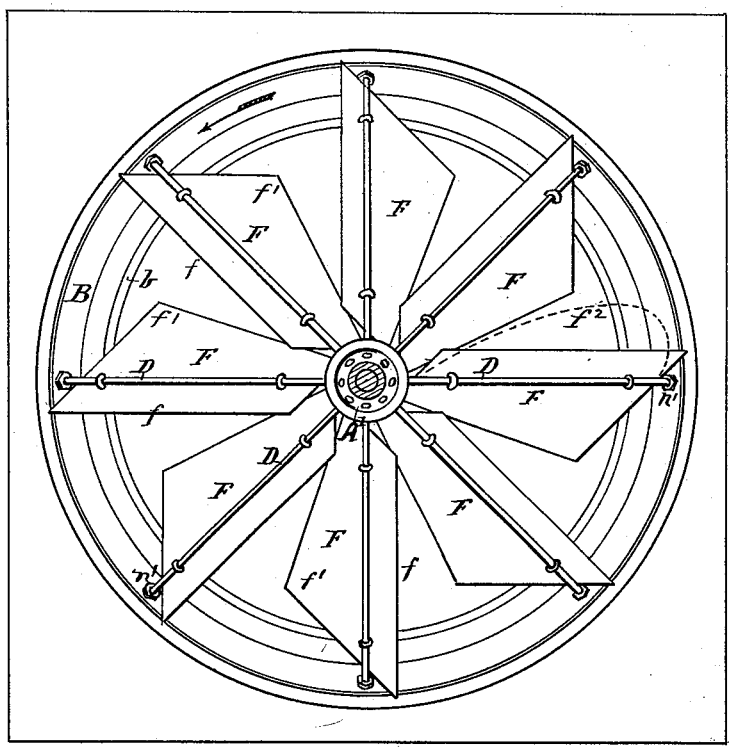
Figure 4:
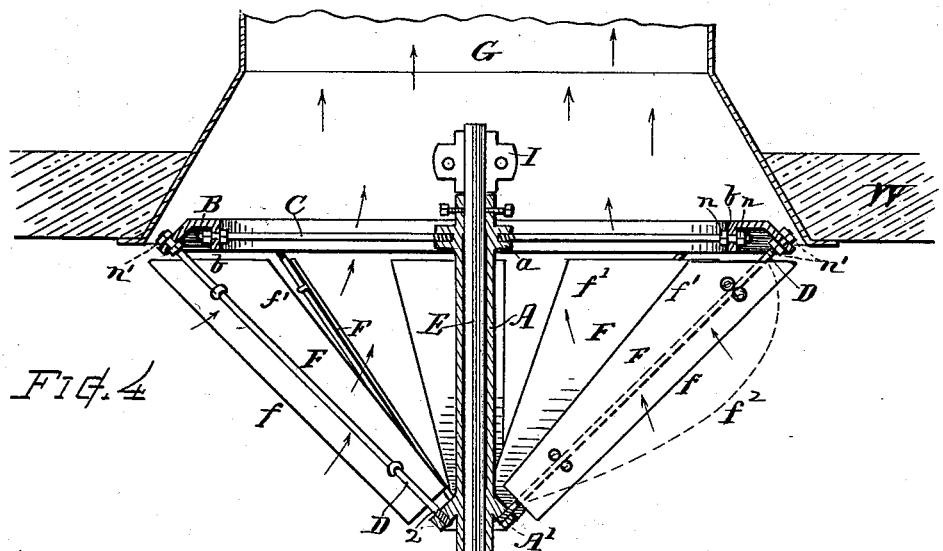
Figure 5:
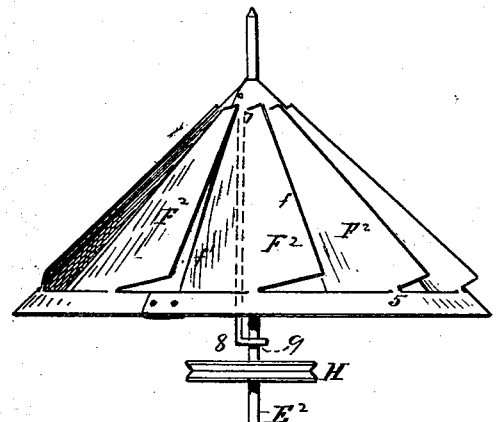
Figure 6:
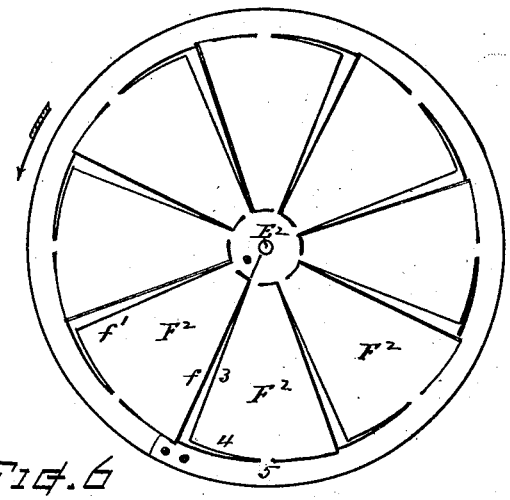
Figure 7:
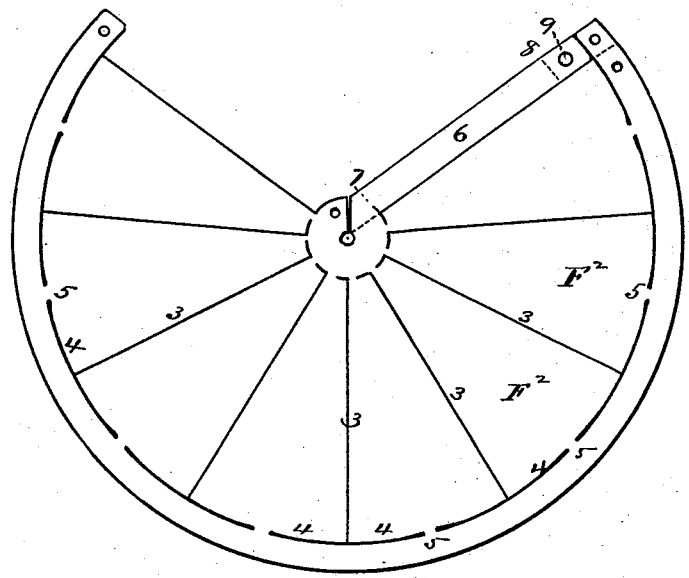

Figure 1 is a front view of my improved fan-wheel or blower as adapted for large diameters. Fig. 2 is a horizontal section of the same. Fig. 3 is a front view of my improved fan-wheel or blowing apparatus as adapted for smaller diameters. Fig. 4 is a horizontal section of this smaller diameter blowing apparatus, and Figs. 5, 6, and 7 show a side, top view, and development diagram, illustrating the form and construction in which very small sized blowers, having transversely oblique longitudinally inclined fans for effecting concentrated blast, can be produced from sheet metal blanks.

This improved blower or fan-wheel comprises an axial body, hub or central sleeve A, at the front end of which there is an inwardly tapering flange or cone A', and at the rear end a boss $a$. A peripheral rim B, having suitable flanges or ears, is supported in connection with the body or sleeve A by a series of radially disposed spokes or rods C, the inner ends of which are screwed into threaded openings in the boss $a$, and their outer ends passed through openings in the rim flange B and retained by nuts $n$ fitted on the threaded ends of the said rods C and turned up firmly against the opposite sides of the rim or flange. From the front end of the body, or its cone or flange A', a series of rods or braces D extends to the rim B, longitudinally inclined backward at an angle of about forty-five degrees, more or less, the front ends of said rods D being screwed into or secured to the cone, as at 2, and their outer ends secured to the rim B by nuts $n'$ or other suitable fastenings. The fans or blades F are arranged between the front end of the body cone A' and the peripheral rim B longitudinally inclined to the inclination of the brace rods D to which they are respectively secured by suitable attaching devices. Said fans are disposed in positions oblique to the circle or line of movement in which they revolve; their outer edges $f$ projecting so as to cut into the air, and their inner portions $f'$ extending inward for deflecting the air center-ward and backward into the mouth of the flue or conductor G as indicated by the pointers, when the fan-wheel is revolved in the direction indicated by the arrow.

The fans are preferably adapted for adjustment to different degrees of oblique relation, and provided with holding devices, or studs $m$, that engage holes $m'$ formed in the outer rim, or in the center piece, for retaining the fan at position when adjusted as required for any particular situation of use. The axial shaft E is arranged through the body or sleeve A which is fixed thereon by set-screws, spline, or otherwise; and said shaft is mounted to rotate in bearings I I, by power transmitted thereto by a driving belt running on the pulley H, or by any well known means.

For blowers of large diameter the conoidal center A' is best made of sheet metal with its inwardly directed smaller end secured to the sleeve or hub A, (See Fig. 2) and its outer or front end, which can be of any required size, may be braced from the axle by suitable arms, as at K. In blower-wheels of smaller diameter the cone A' can be formed as a flange or head cast integral with the sleeve A. (See Fig. 4.) The edge of the fans can, if in any instance desired, be made on a curved line instead of straight (see dotted lines $f^2$, Figs. 3 and 4).

For making very small sized blowers, and for cheapness of construction, the fans can be stamped from a sheet of metal, said sheet being cut to form a circular segmental blank, Fig. 7, which is slitted at 3 and 4 leaving small attachments at 5, and bent up in the shape of a cone, Figs. 5 and 6, with sides inclined about forty five degrees to its axis, and the individual blades $F^2$ cut therein, twisted to oblique positions, as shown. A strip of the metal sheet at 6 is best cut off at one side and bent as shown at 7, and offset at 8 and punched at 9 to form a support on the axle-shaft $E^2$, which latter can be of wire.

The blower-wheel is arranged for operation over the mouth of the ventilating flue G, or an opening in the wall W leading to an air chamber, and rapid rotation of the blower-wheel induces a strong concentrated current therethrough.

By constructing the blower with its oblique fans or blades disposed as shown, and longitudinally inclined at an angle of about forty five degrees, more or less, with the axis of revolution, the fans throw the air inward instead of outward at the periphery of the wheel and thereby effect the concentration of the current and the avoidance of dead air or eddying currents at the center of the wheel, while a stronger and more desirable blast is produced as the peripheral current creates more or less of an induced current at the center or inner portion of the wheel; thus obviating an objection incident to fans that allow centrifugal action of the forced air, wherein the forcing of the air is done at the periphery and the air is dormant or backward at the points where the relative speed of the fans is below the average distance of movement per second.

Another advantage is that by arranging the fans longitudinally inclined, the length of the cutting edge of the fans is much greater for a given diameter of wheel than with the fans disposed perpendicular to the axis of rotation. For use as an exhaust or suction blower the wheel is rotated in opposite direction.

I am aware that rotatable fan-wheels of different kinds are in use for ventilating purposes; hence it will be understood that my invention and claims relate to mechanism having the peculiar features of construction herein illustrated and defined.

I claim as my invention herein, to be secured by Letters Patent—

1. The revoluble fan-wheel provided with an axial body or central sleeve, an annular peripheral rim connected with one end of said body by radial spokes or rods and with the opposite end of the body, or its conoidal flange, by brace-rods disposed about forty-five degrees angular to the axis of rotation, and having its series of blades or fans longitudinally disposed in connection with said brace-rods and standing in transversely oblique positions between said annular rim and the outer end of the axial body, substantially as set forth.

2. A rotatable blower-wheel of the character hereinbefore described, having a peripheral rim, a support upon the axial shaft substantially in the plane of said rim, and a closed center or cone supported on said shaft forward of the plane of the rim, the fans disposed transversely oblique and longitudinally inclined, relatively to the axis of rotation, and converging toward the forward end of the wheel; said fans connected with said rim, and forward center, by attachments that afford facility for varying the oblique adjustment of the fans, the advance edges of said fans standing outward for cutting into the air and their rear edges standing inward for directing the air backwardly center-ward in a concentrated blast, substantially as set forth.

3. A blower or fan-wheel having a central conoidal or inwardly tapering body, an annular rim connected with the inner end of said body by a series of radial rods disposed in a plane substantially perpendicular to the central axis, and with the outer or larger end of the conoidal body by a series of rods disposed at a backwardly inclined position, said rods rigidly connecting the body and rim, a series of fans or blades pivotally connected with said inclined rods, and means for securing said fans at different positions of oblique adjustment, substantially as hereinbefore set forth.

4. In a fan-wheel the combination, substantially as described, with the flue or air passage, of the supporting shaft, bearings therefor, the axial body or cone, the annular peripheral rim, the radial rods connecting the rear end of said body with the rim, the backwardly inclined brace-rods connecting the front end of the body or cone with said annular rim, and the fans or blades attached to said inclined rods and disposed in positions oblique to the circle of rotation, for the purposes set forth.

Witness my hand this 19th day of December, A. D. 1892.

FRED P. SMITH.

Witnesses:
CHAS. H. BURLEIGH,
ELLA P. BLENUS.